United States Patent
Chevalley et al.

(10) Patent No.: US 10,322,819 B2
(45) Date of Patent: Jun. 18, 2019

(54) AUTONOMOUS SYSTEM FOR TAKING MOVING IMAGES FROM A DRONE, WITH TARGET TRACKING AND IMPROVED TARGET LOCATION

(71) Applicant: PARROT DRONES, Paris (FR)

(72) Inventors: Laure Chevalley, Paris (FR); Edouard Leurent, Paris (FR)

(73) Assignee: PARROT DRONES, Paris (FR)

( * ) Notice: Subject to any disclaimer, the term of this patent is extended or adjusted under 35 U.S.C. 154(b) by 12 days.

(21) Appl. No.: 15/657,145

(22) Filed: Jul. 22, 2017

(65) Prior Publication Data
US 2018/0022472 A1  Jan. 25, 2018

(30) Foreign Application Priority Data
Jul. 22, 2016  (FR) .................................... 16 57006

(51) Int. Cl.
*B64D 47/08* (2006.01)
*B64C 39/02* (2006.01)
(Continued)

(52) U.S. Cl.
CPC ............ *B64D 47/08* (2013.01); *B64C 39/024* (2013.01); *G01S 17/023* (2013.01);
(Continued)

(58) Field of Classification Search
CPC . B64D 47/08; B64C 39/024; B64C 2201/127; B64C 2201/141; G01S 17/023;
(Continued)

(56) References Cited

U.S. PATENT DOCUMENTS

| | | | |
|---|---|---|---|
| 2009/0157233 A1* | 6/2009 | Kokkeby ............ | G01S 3/7864 701/3 |
| 2015/0298822 A1* | 10/2015 | Eline .................... | B64C 39/024 244/75.1 |

(Continued)

OTHER PUBLICATIONS

Grossman, "Bearings-Only Tracking: A Hybrid Coordinate System Approach," p. 2032-2037, Proceedings of the 30th Conference on Decision and Control, 1991, IEEE.*

(Continued)

*Primary Examiner* — Courtney D Heinle
(74) *Attorney, Agent, or Firm* — Steven M. Greenberg, Esq.; Shutts & Bowen LLP

(57) ABSTRACT

The displacements of the drone are defined by piloting commands to take moving images of a target carrying the ground station. The system comprises means for adjusting the sight angle of the camera during the displacements of the drone and of the target, so that the images are centerd to the target, and means for generating flying instructions so that the distance between drone and target fulfills determined rules, these means being based on a determination of the GPS geographical position of the target with respect to the GPS geographical position of the drone, and of the angular position of the target with respect to a main axis of the drone. These means are also based on the analysis of a non-geographical signal produced by the target and received by the drone. The system allows freeing from the uncertainty of the GPS systems equipping this type of device.

9 Claims, 2 Drawing Sheets

(51) Int. Cl.
  *G01S 17/02* (2006.01)
  *H04N 5/225* (2006.01)
  *H04N 5/232* (2006.01)
  *G05D 1/00* (2006.01)
  *H04N 17/00* (2006.01)

(52) U.S. Cl.
  CPC ......... *G05D 1/0094* (2013.01); *H04N 5/2253* (2013.01); *H04N 5/2259* (2013.01); *H04N 5/23238* (2013.01); *H04N 17/002* (2013.01); *B64C 2201/127* (2013.01); *B64C 2201/141* (2013.01)

(58) Field of Classification Search
  CPC ........ G05D 1/12; G05D 1/101; G05D 1/0094; H04N 5/2253; H04N 5/23238; H04N 5/2259; H04N 17/002
  See application file for complete search history.

(56) References Cited

U.S. PATENT DOCUMENTS

| | | | |
|---|---|---|---|
| 2016/0031559 A1* | 2/2016 | Zang | G05D 1/0038 701/2 |
| 2017/0038781 A1* | 2/2017 | Querejeta Masaveu | B64C 39/024 |
| 2017/0205826 A1* | 7/2017 | Smith | G05D 1/0094 |
| 2018/0046188 A1* | 2/2018 | Hwang | B64C 39/02 |

OTHER PUBLICATIONS

Fakhreddine, "Advanced 3D Localization by Fusing Measurements from GPS, Inertial and Vision Sensors," p. 871-875, Proceedings of the 2009 IEEE International Conference on Systems, Man, and Cybernetics, 2009, IEEE.*

* cited by examiner

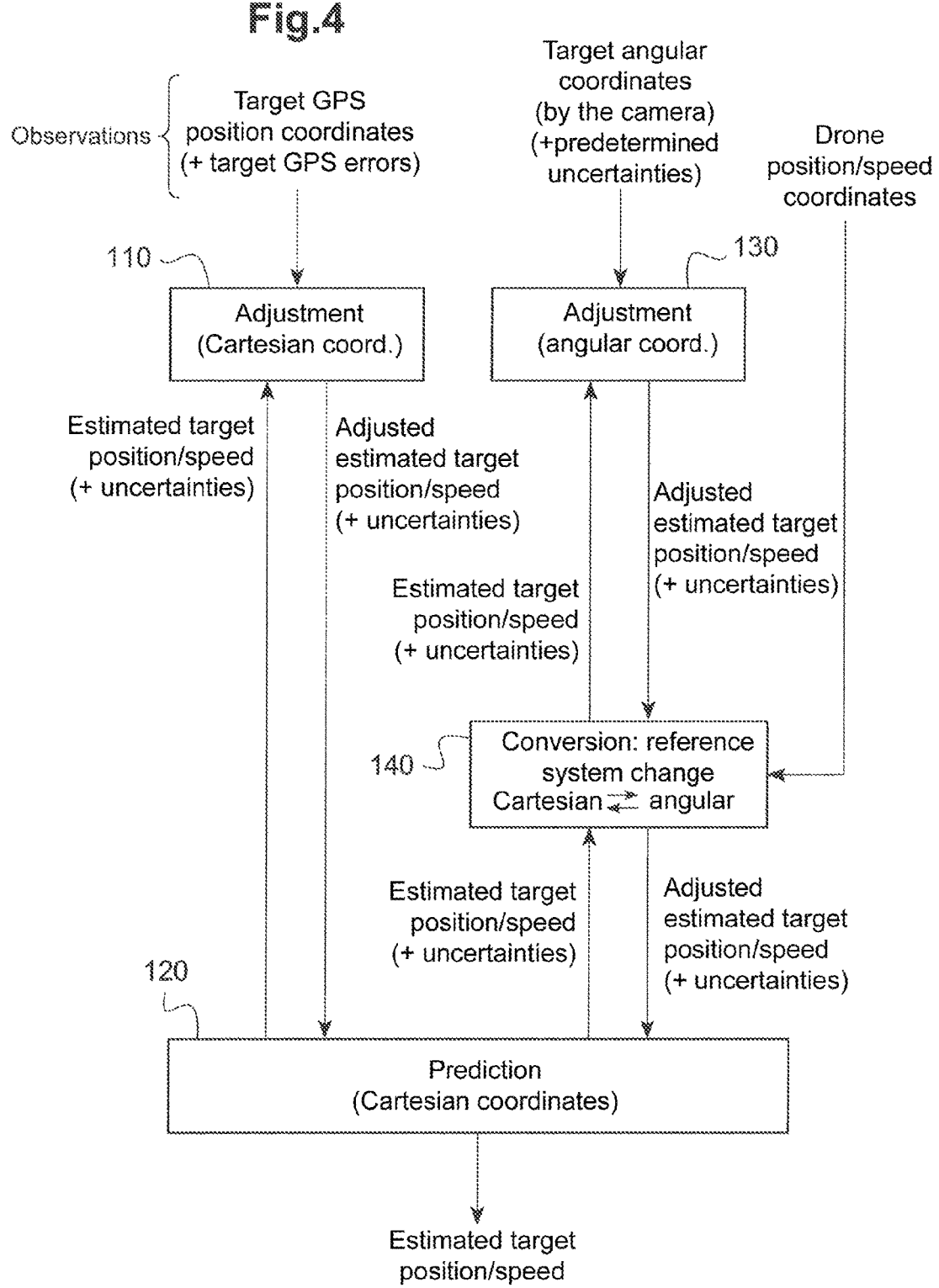

AUTONOMOUS SYSTEM FOR TAKING MOVING IMAGES FROM A DRONE, WITH TARGET TRACKING AND IMPROVED TARGET LOCATION

CROSS REFERENCE TO RELATED APPLICATIONS

This application claims priority under 35 U.S.C. § 119(a) to French Patent Application Serial Number 1657006, filed Jul. 22, 2016, the entire teachings of which are incorporated herein by reference.

BACKGROUND OF THE INVENTION

Field of the Invention

The invention relates to remote-piloted flying motorized devices, hereinafter generally called "drones".

Description of the Related Art

The invention specifically applies to rotary-wing drones, such as the quadricopters, a typical example of which is the Bebop of Parrot SA, Paris, France, which is a drone equipped with a series of sensors (accelerometers, three-axis gyrometers, altimeter), a front camera capturing an image of the scene towards which the drone is directed, and a vertical-view camera capturing an image of the overflown terrain.

But the invention may apply as well to other types of drones, for example fixed-wing drones, in particular of the "flying wing" type such as, for example, the eBee model of SenseFly, Cheseaux-Lausanne, Switzerland, which is a professional land-mapping drone, or the Disco model recently presented by Parrot SA, Paris, France.

Rotary-wing drones are provided with multiple rotors driven by respective motors able to be controlled in a differentiated manner in order to pilot the drone in attitude and speed.

The documents WO 2010/061099 A2 and EP 2 364 757 A1 (Parrot SA) describe such a drone as well as the principle of piloting thereof by means of a terminal such as a touch-screen multimedia telephone or player with an integrated accelerometer, for example a cellular phone of the iPhone type or a multimedia tablet of the iPad type (registered trademarks). These devices incorporate the various control elements required for the detection of the piloting commands and the bidirectional exchange of data via a radio link of the Wi-Fi (IEEE 802.11) or Bluetooth wireless local network type. They are further provided with a touch screen displaying the image captured by the front camera of the drone, with in superimposition a number of symbols allowing the activation of commands by simple contact of the operator's finger on this touch screen.

The front video camera of the drone may be used to capture sequences of images of a scene towards which the drone is directed. The user can hence use the drone in the same way as a camera or a camcorder that, instead of being held in hand, would be borne by the drone. The images collected can be recorded then broadcast, put online on video sequence hosting web sites, sent to other Internet users, shared on social networks, etc.

The front camera is advantageously a steerable camera, in order to direct in a controlled manner in a predetermined direction the sight axis, and hence the field of the images transmitted with the video stream. A technique implemented in particular in the above-mentioned Bebop device and described in the EP 2 933 775 A1 consists is using a high-definition wide-angle camera provided with a hemispherical-field lens of the fisheye type covering a field of about 180° and in windowing in real time the raw image delivered by this sensor, by a software processing ensuring the selection of the useful pixels of the raw image in a determined capture zone as a function of a certain number of parameters, including commands of pointing towards a particular target chosen by the user or automatically followed by the drone. As a variant, or even as a complement, of the control of the camera sight axis by a windowing software program, it is also possible to mount the camera on a three-axis articulated support of the gimbal type with Cardan suspension, provided with servomotors piloted as a function of the gyrometer data and of the pointing commands. The invention applies of course to any type of camera, steerable or not, and whatever is the pointing mode thereof.

In a so-called tracking mode, the drone can be programmed to follow a mobile target whose coordinates are known and so that, during the flight, the sight axis of the camera is directed towards said target. This target is typically the terminal itself, carried by a user who may be in motion (for example, practicing a sport in which he moves—running, sliding, driving, etc.). In this mode, the drone is capable of filming the evolutions of the user without the latter has to act on the displacements of the drone and on the sight axis of the camera.

For that purpose, the coordinates of the terminal, obtained by a GPS unit equipping the latter in a manner known per se, are communicated to the drone through the wireless link, and the drone can hence adjust its displacements so as to follow the terminal and so that the sight axis of the camera remains directed towards the terminal, so that the image hence remains centred to the subject.

However, obtaining a good framing by means of only the GPS coordinates of the target remains problematic. Indeed, the GPS units on-board the terminals of the smartphone type are cheap consumer units, suffering from a lack of accuracy with respect to the theoretical possibilities of the GPS satellite system. De facto, the error on the delivered coordinates can reach 5 to 10 meters with respect to the exact position.

Hence, in some cases, the user is badly framed, or even simply out of frame.

Moreover, the rate at which these GPS coordinates are delivered by the GPS unit is generally rather slow (1 set of coordinates per second), which make it difficult to follow displacements of the target, in particular when the user is in fast acceleration along non-regular trajectories.

To try freeing from the inaccuracies linked to the GPS units equipping this type of devices, the EP 2 071 353 A2 proposes to combine the data delivered by the GPS unit from the tracked target with data coming from an analysis of the video image of this target, taken by the tracker drone. The sight axis of the camera is adjusted based on these combined data, by modification of the direction of the tracker drone and/or of the on-board video camera. A predictive model, permanently corrected by the effective-state information collected, allows improving the accuracy of the adjustment.

BRIEF SUMMARY OF THE INVENTION

An object of the invention is to propose such a system allowing a drone, in an autonomous shooting mode for shooting a target in motion, to further improve the adjustment of the camera for tracking this target, and to benefit from a better defined relative position of the drone and of the target by partially freeing from the inaccuracies linked to the GPS units equipping this type of device.

The invention proposes for that purpose a system of the type disclosed by the above-mentioned EP 2 071 353 A2, i.e. a system for taking moving images, comprising a drone provided with a camera and a ground station communicating with the drone through a wireless link, the displacements of the drone being defined by flying instructions applied to a propulsion unit or a set of propulsion units of the drone, the drone being adapted to fly autonomously to take moving images of a target moving with the ground station.

More precisely, this system comprises means for adjusting the sight angle of the camera during the displacements of the drone and of the target so that the images taken by the camera are centred to the target, and means for generating said flying instructions to control the displacement of the drone towards the target and so that the distance and the angular position between the drone and the target fulfil determined rules.

The means for adjusting the sight angle and for generating said flying instructions are based: i) on a determination of the GPS geographical position of the target with respect to the GPS geographical position of the drone, and of the angular position of the target with respect to a main axis linked to the drone, and ii) on the analysis of a signal produced by analysis of the images successively delivered by the camera of the drone and/or produced by the target and received by the drone.

Characteristically of the invention, the system also includes a merging software engine adapted to merge, in order to obtain refined information about the geographical position of the target:
  i) information about the geographical position of the target, also comprising an associated value of uncertainty of the said geographical position, and
  ii) information about the angular position of the target with respect to a main axis linked to the drone, also comprising an associated value of uncertainty of said angular position.

More precisely, the merging software engine comprises a hybrid-coordinates extended Kalman filter, comprising:
  a prediction unit sensitive to a model of prediction of the target movement and operating based on: i) adjusted estimates of the target position and speed obtained based on said target geographical position information and ii) adjusted estimates of the target position and speed obtained based on said angular position information, as well as iii) respective uncertainties of said estimates;
  a first adjustment unit receiving as an input the target geographical position and speed and estimates of the target position and speed coming from the prediction unit, as well as their respective uncertainties, and delivering as an output adjusted values of the target position and speed, as well as their respective uncertainties; and
  a second adjustment unit receiving as an input the target angular position and speed and estimates of the target angular position and speed coming from the prediction unit, as well as their respective uncertainties, and delivering as an output adjusted values of the target position and speed, as well as their respective uncertainties.

The prediction model is preferably a constant target speed model.

Very advantageously, the merging software engine further comprises a conversion unit adapted to convert the target position and speed information, generated in Cartesian coordinates, into corresponding information converted into angular coordinates, and vice versa, and in that said second adjustment unit operates in angular coordinates.

The merging software engine is in particular adapted to take into account at least one additional piece of information among: information about the measured altitude of the target; information about the measured acceleration of the target; information about the measured distance between the drone and the target; and additional information about a scale or a scale change in the images taken by the camera.

Preferably, the rate of analysis of the signal produced by analysis of the images successively delivered by the camera of the drone, and/or produced by the target and received by the drone, is higher than the rate at which the GPS geographical positions are determined.

Also preferably, the signal produced by analysis of the images successively delivered by the camera of the drone and/or produced by the target and received by the drone, is a visual signal of position of the target in the images generated by the camera of the drone, and the system includes means for locating and following in the successive images the location of said signal.

The camera can be, in this case, a wide-angle fixed camera of the fisheye type, the means for adjusting the sight angle of the camera being then adapted to frame and process the wide-angle images taken by the camera, or a camera mounted on a three-axis articulated support of the gimbal type with Cardan suspension, provided with servomotors piloted by said means for adjusting the sight angle of the camera.

In a particular embodiment variant, the signal produced by analysis of the images successively delivered by the camera of the drone and/or produced by the target and received by the drone is a signal of the lidar type reflected by the target from an emission by the drone.

BRIEF DESCRIPTION OF THE SEVERAL VIEWS OF THE DRAWINGS

An exemplary embodiment of the drone according to the invention will now be described, with reference to the appended drawings in which the same references denote identical or functionally similar elements throughout the figures.

FIG. 4 is a block diagram of a merging engine between two sets of information useful to generate these coordinates of improved accuracy.

DETAILED DESCRIPTION OF THE INVENTION

Figure 1:
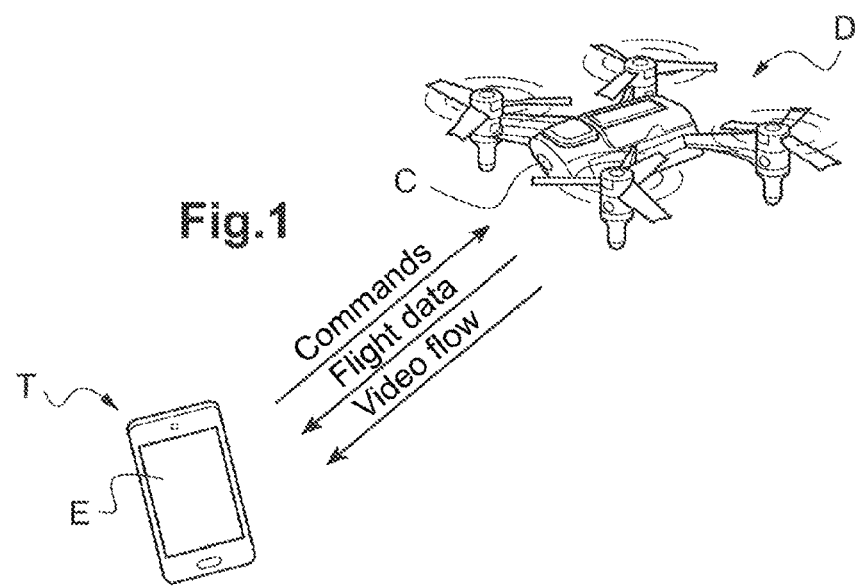
FIG. 1 is a schematic overall view of a shooting system comprising a drone and a ground station.

An exemplary embodiment of the invention will now be described.

It applies to a drone, for example a drone of the quadricopter type, such as the Parrot Be-bop Drone, the various technical aspects of which are described in the above-mentioned EP 2 364 757 A1, EP 2 613 213 A1, EP 2 450 862 A1 or EP 2 613 214 A1

The drone D includes coplanar rotors whose motors are piloted independently by an integrated navigation and attitude control system. It is provided with a front-view camera C allowing obtaining an image of the scene towards which the drone is directed.

The drone may also preferably include a second, vertical-view camera (not shown), pointing downward, adapted to capture successive images of the overflown terrain and used in particular to evaluate the speed of the drone relative to the ground.

Inertial sensors (accelerometers and gyrometers) allow measuring with a certain accuracy the angular speeds and the attitude angles of the drone, i.e. the Euler angles (pitch, roll and yaw) describing the inclination of the drone with respect to a horizontal plane of a fixed terrestrial reference system, it being understood that the two longitudinal and transverse components of the horizontal speed are intimately linked to the inclination following the two respective pitch and roll axes. An ultrasonic range finder placed under the drone moreover provides a measurement of the altitude with respect to the ground. The drone is also provided with location means allowing determining its absolute position in space, in particular based on data coming from a GPS receiver.

The camera C is preferably a hemispheric-field fixed camera of the fisheye type, as described for example in the EP 2 933 775 A1 (Parrot). With such a camera, the changes of the camera sight axis are not made by physical displacement of the camera, but by framing and processing the images taken by the camera as a function of a virtual sight angle, determined with respect to the main axis of the drone, given as a set-point.

The "main axis" of the drone, which is an axis to be considered in a reference system linked to the drone, is typically the longitudinal axis of the drone (so-called "roll" or "heading" axis). The sight axis of the camera may be merged with this main axis, or form a constant angle with the latter, for example inclined downward, as described in the above-mentioned EP 2 933 775 A1.

The drone D is piloted by a ground station T, typically in the form of a remote-control device, for example of the model aircraft remote-control type, a smartphone or a smart tablet. The smartphone or the smart tablet are provided with a touch screen E displaying the image inside the front camera C, with, in superimposition, a certain number of symbols allowing the activation of piloting commands by simple contact of a user's finger on the touch screen E. When the drone D is piloted by a station T of the remote-control type, the user may be provided with immersive piloting glasses, often called FPV ("First Person View") glasses. The device T is also provided with means for radio link with the drone D, for example of the Wi-Fi (IEEE 802.11) local network type, for the bidirectional exchange of data from the drone D to the device T, in particular for the transmission of the image captured by the camera C and of flight data, and from the device T to the drone D for the sending of piloting commands.

The system consisted by the drone D and the device T is configured so that the drone is provided with the ability to autonomously follow and film a target, typically the target consisted by the device T itself carried by the user.

Figure 2:
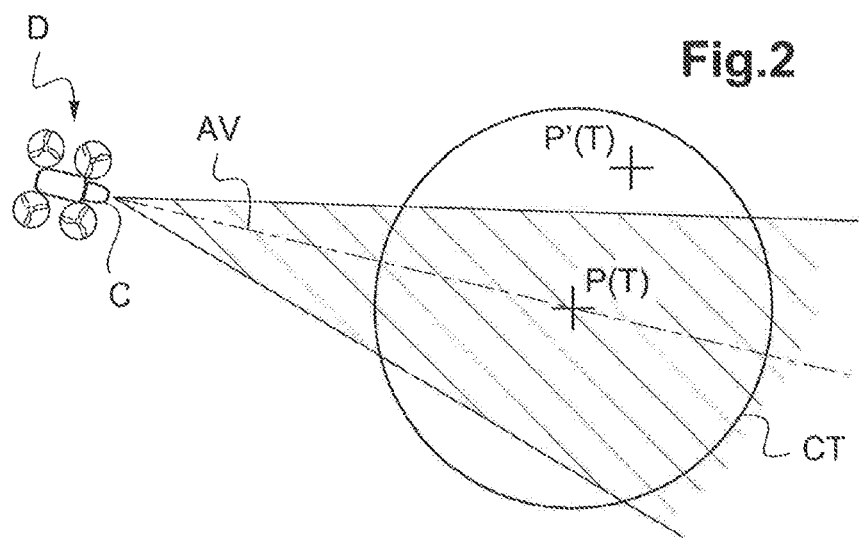
FIG. 2 is a diagram illustrating the difficulty to frame a target from a drone when the coordinates of the target with respect to the drone are defined in a very inaccurate manner.

With reference to FIG. 2, the drone D has been schematically shown in autonomous motion, equipped with the camera C intended to take a sequence of moving images of the target, whose position is fundamentally given by the GPS coordinates of the terminal T. These coordinates are delivered by the GPS unit of the terminal at low rate (generally about 1 Hz) and transmitted to the drone so that the latter adjusts the sight axis of the camera C to the terminal T and hence to the user. The so-produced data will be hereinafter called "geographical position" data, insofar as they indicate the position of the drone in a geo-centred, absolute Galilean reference system.

According to the prior art, the sight axis of the camera C is determined based on the coordinates of the vector connecting the drone, whose position P(D) is indicated by the GPS unit on board the drone.

The circle CT in FIG. 2 shows the sphere of the maximum cumulated uncertainties of the GPS units of the drone D and of the terminal T, whereas the hatched zone represents the field of the images taken by the camera C, centred to its sight axis AV. It is understood that, if errors in the GPS coordinates of the drone and of the target, indicated by their respective GPS units, cause the position of the target with respect to the drone to be P'(T) whereas the position evaluated by the GPS is P(T), the subject carrying the target may be very off-centred in the image, and in certain cases, it may be out of frame, as illustrated in FIG. 2.

The means for determining the sight axis of the camera C are completed by the taking into account of a signal generated based on the target itself, able to indicate an angular position of the target, with a given uncertainty, with respect to the main axis of the drone. This signal will be hereinafter qualified as "non-geographical" insofar as, by opposition to the signal of "geographical position" of the drone (GPS data), it does not give an indication of the absolute position of the latter in a geo-centred reference system but only an indication of the relative position occupied by the target with respect to the drone.

In a first embodiment, the non-geographical signal is a lidar signal reflected by the user from an incident laser signal emitted by a specific source on board the drone, according to a technology of angular detection known per se. From the reflected signal, the drone is able to collect, at a faster rate than that of the GPS coordinates and more accurately, information representative of the direction of the vector (three-dimensional) going from the laser source to the user.

In a second embodiment, the non-geographical signal is a signal deduced from the visual presence of the target in the raw wide-angle image taken by the camera. For that purpose, an image analysis program provided in the central unit on board the drone, or in a dedicated circuit, is configured to follow the displacement of the user in the sequence of images generated by the camera and to deduce therefrom in which angular direction the user is with respect to the main axis of the drone, generally merged with the optical axis of the fisheye camera. More precisely, this program is configured to locate and follow in the successive images a visual pattern or a colour spot representative of the visual aspect of the target with respect to a background (for example, a pattern elaborated by analysis of the grey levels of the image). For example, for taking images of a user practicing a snow sport, the background will generally be white and the colour of the spot in the images will be that of the clothes of the user. This approach moreover allows having angular data of position of the user to be followed at a rate substantially faster than that at which the GPS coordinates are delivered, i.e. the rate of the images that is typically of 30 images per second for this type of application.

Figure 3:
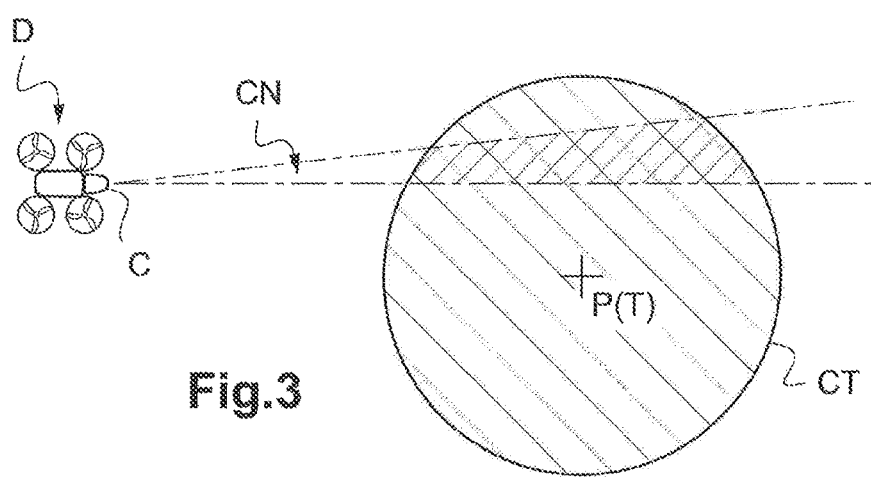
FIG. 3 is a diagram illustrating the way the coordinates of the target with respect to the drone may be defined with an improved accuracy.

FIG. 3 illustrates the improvement of the position of the target viewed from the drone thanks to the knowledge of the angular information collected with a known uncertainty, whether it is thanks to a lidar system or another dedicated hardware system, or by the analysis of the angular position of the target in the image taken by the camera C. The electronic devices on board the drone are capable of knowing, by cross-checking between the GPS data and these angular detection data, that the target is at the crossing between the sphere of uncertainty CT inherent to the GPS measurement and the cone of uncertainty CN inherent to the determination of the above-mentioned angular position.

The invention more precisely relates to the way the position data obtained by the GPS units of the drone D and the terminal T, on the one hand, and by the determination of the angular position of the target with respect to the axis of the drone, on the other hand, are merged together to reach this improvement of the determination of the target position and speed.

This operation implements a "merging engine" as computer science means the term "engine", i.e. a software component that performs a task automatically, without human intervention.

The merging engine is implemented by digital processing, preferably in the drone D itself or, as the case may be, in the terminal T with which the drone is in permanent high-rate communication via the Wi-Fi link. The processing is adapted to keep the accuracy of the angular detection (for example ±5°) and the accuracy of the distance determined based on the GPS coordinates of the terminal and the drone (typically from 5 to 10 meters with the consumer GPS units).

In embodiment variants, the above-mentioned processing operations may be operated within a remote cloud server with which the drone is registered. The latter is then provided, in addition to the WiFi communication module through which it exchanges data with the terminal T, with another communication module allowing it to connect directly to a 3G or 4G mobile phone network. It is then possible to transfer to this cloud server a certain number of piloting operations and computations, of image processing, etc. instead of executing them in a processor on-board the drone or the remote-control terminal.

Moreover, the sequence of images taken by the camera C of the drone D during the traveling thereof can be either stored in a memory on-board the drone then transferred towards the terminal or another smart device at the end of the flight, or streamed during the shooting itself, and stored in the terminal T, or also transferred to a cloud server in the hypothesis indicated hereinabove.

In any case, the digital processing is moreover based on a motion model allowing propagating the estimation of the location between two consecutive measurements.

The merging of measurements of different natures (Cartesian coordinates for the GPS data and spherical coordinates for the angular detection), each having their own inaccuracies determined in these two coordinate systems, is advantageously performed with a circuit of the Hybrid Coordinate Extended Kalman filter HC-EKF type.

In a manner known per se, a Kalman filter implements a state estimator, which is an infinite pulse response filter estimating the states of the dynamic system, herein the geographical position of the target and the speed thereof, based on a series of measurements applied at the input. The general principles of this technique will be found, for example, in R. E. Kalman, *A new Approach to Linear Filtering and Prediction Problems*, Transactions of the ASME—*Journal of Basic Engineering*, Vol. 82 (1960).

Details of a filter of the HC-EKF type, applied to the guiding of autonomous ammunitions are given by K. Ezal et C. Agate, Tracking and interception of ground-based RF sources using autonomous guided munitions with passive bearings-only sensors and tracking algorithms, Toyon Research Corporation, 75 Aero Camino, Suite A, Goleta, Calif., USA 93117.

In the present case, the Kalman filter receives as an input:
the coordinates $x_C$, $y_C$, $z_C$ given by the GPS unit and the speed $vx_C$, $vy_C$, $vz_C$ of the target at an instant to then at successive instants $t_1$, . . . , in a Cartesian coordinates system (the speed being estimated by the spacing between successive positions measured by the GPS unit of the terminal T, divided by the elapsed time), and the angular position of the target with respect to the main axis of the drone, herein given by analysis of the images taken by the camera C by locating the visual pattern formed by the user in each image taken, and represented by an angular coordinate $ah_C$ in the horizontal plane and an angular coordinate $av_C$ in the vertical plane, with a given uncertainty inherent to the way these angular coordinates are obtained.

The dynamic system of the Kalman filter is consisted by a set of equations that describes the behaviour of the target. Such a modelling is described in particular in the EP 2 431 084 A1, to which reference can be made for more details.

The Kalman filter operates in two phases (which will be described in more details hereinafter with reference to FIG. 4), with successively:

1°) a prediction phase, performed at each iteration of the filter: this phase consists in predicting the target position and speed by means:
  on the one hand, of the estimates (decorrelated) of the position and speed—and of the associated uncertainties thereof—, adjusted as a function of the previous propagations of the iterative filter, to obtain as an output data of position and speed—as well as the uncertainties thereof—which can be used to anticipate the displacements of the drone, and
  on the other hand, a predictive model of dynamic behaviour of the target.
    i) In the present example, the dynamic model is a model in which the speed of the target is constant.
    ii) The predictive model also comprises an error model allowing making evolve the values of the uncertainties associated with the states estimates during the propagation thereof;

2°) an adjustment phase, which consists in correcting the above prediction using:
  the current measurement (in spherical coordinates) of the angular position of the target with respect to the main axis of the drone. This step is preferably implemented each time a new image is delivered by the camera C, hence herein at a rate of 30 times per second; and
  the current measurement (in Cartesian coordinates) of the position of the target given by the GPS of the latter. This adjustment is operated each time a new GPS position is delivered, typically at a rate of 1 Hz.

By these prediction and adjustment phases, the Kalman filter uses and estimates:
  the state of the angular position of the target with respect to the main axis of the drone, so as to frame the image of the camera in such a manner that the target is centred in the image and to correctly position the drone, as well as
  the distance between the target and the drone, so as to generate flying instructions allowing the drone to adapt its trajectory in order to follow the target, herein by maintaining this distance constant.

FIG. 4 shows as a block diagram the different processing operations implemented.

In this figure are indicated the various input data measured (observations), which are:
  the coordinates (Cartesian) of the target position produced by the target GPS;

an indication of the associated errors of the target GPS;

the angular coordinates of the target, produced from the image of the drone camera;

a predetermined uncertainty corresponding to these angular coordinates; and the coordinates of the drone position and speed, produced by the piloting system of the latter.

The position coordinates produced by the target GPS are applied, with the associated GPS errors, to a first adjustment block 110, adjustment that is operated as a function of the estimated target position and speed (this information and the associated uncertainties thereof being delivered, as will be seen hereinafter, by the prediction block 120 of the Kalman filter). The position and speed values adjusted by the block 110 and their associated uncertainties (values that are all in Cartesian coordinates) constitute first input parameters of the prediction block 120 of the Kalman filter.

The angular coordinates of the target derived from the analysis of the image captured by the camera, as well as the associated predetermined uncertainties of the angular measurement, are applied to a second adjustment block 130, which also receives as an input the estimates of the target position and speed, with their associated uncertainties, parameters that are all expressed in angular coordinates. The block 130 delivers as an output corresponding adjusted data, also expressed in angular coordinates. The adjustment operated by the block 130 as a function of the estimates of the target position and speed, of the associated uncertainties, of the target coordinates, and of a predetermined error of angle measurement.

The processing operated within the prediction block 120 of the Kalman filter produces as an output:

estimates of the target position and speed based, as indicated hereinabove, on a dynamic prediction model describing the behaviour of the target (for example, a model in which the speed of the target is constant), also comprising an associated error model allowing making evolve the uncertainty of the state estimated during the propagation thereof, at the successive iterations of the Kalman filter; and uncertainty values associated with these target position and speed estimates.

As described hereinabove, these outputs of the prediction block (estimates and associated uncertainties) are reintroduced into the adjustment blocks 110 and 130, and this looping allows in particular maintaining the prediction when the target GPS data and/or angular position data are temporarily lost for any reason.

Moreover, the fact to process not only the data themselves, but also their associated uncertainties, allows making the measurement far more accurate and reliable.

According to a particularly advantageous aspect of the invention, a block 140 of conversion of Cartesian coordinates into angular coordinates (and vice versa) is interposed between the block 130 for adjusting the parameters deduced from the analysis of the camera images, and the prediction block 120 of the Kalman filter.

Indeed, as the measurements of the target angular position deduced by analysis of the images of the camera are highly non-linear with respect to the current state of the filter expressed in Cartesian coordinates, they cannot be used as such for an adjustment according to the principle of the Kalman filter.

Moreover, it is not sufficient to linearize these non-linear measurements locally about the current estimated state (which is traditionally done and which constitutes the principle of the extended Kalman filter), because it does not guarantee the convergence of the filter, and would provide bad results in the present application.

The merging engine hence operates a linearization of the measurements by performing a change of the coordinate system, from angular coordinates (spherical) to Cartesian coordinates, and vice versa.

This transformation, despite the lack of exactitude that may result therefrom, allows obtaining between the state of the filter and the angular measurement given by the images of the camera, a linearity guarantying the stability of the filter due to the homogeneity of the different pieces of information applied at the input of the latter.

It will be noted that the conversion block 140 also receives as an input the information of position and speed coordinates of the drone given by the piloting circuit of the latter. This allows knowing at any time the orientation of the own reference system of the drone, expressed in Cartesian coordinates.

In practice, the above-described operations are iterated at the rate of the images taken by the camera (typically 30 Hz), a new observation of angular position of the target being available at each of these iterations. A new observation of the GPS coordinates is on the other hand available only at a rate of 1 Hz, and is hence taken into account by the block 110 once every 30 iterations.

It will be noted herein that the processing by the Kalman filter may be optionally improved by the taking into account of additional pieces of information and in particular by:

an approximation of the target speed, determined based on two successive GPS measurements by the GPS unit of the terminal and the time difference that separates them;

a measurement of the target altitude, for example by means of a barometer integrated to the terminal T;

a measurement of a scale or a scale change in the images taken by the camera, for the embodiment in which the angular position is deduced from these images;

a measurement of the target acceleration, obtained for example from an inertial unit equipping the terminal T; and/or a measurement of distance between the drone and the target, for example by means of a travel time sensor, based on ultra-wide band (UWB) radio pulses emitted by the drone in a field directed in front of it, with a suitable field width.

The invention claimed is:

1. A system for taking moving images, comprising:
a drone provided with a camera, and a ground station communicating with the drone through a wireless link, the displacements of the drone being defined by flying instructions applied to a propulsion unit or a set of propulsion units of the drone, the drone being adapted to fly autonomously to take moving images of a target moving in concert with the ground station when both are held by an individual,
a processor and memory; and,
a drone management module comprising program code executing by the processor to perform:
adjusting the sight angle of the camera during the displacements of the drone and of the target that moves in concert with the ground station so that the images taken by the camera are centred to the target; and
generating said flying instructions to control the displacement of the drone towards the target moving in concert with the ground station and so that the distance and the angular position between the drone and the target fulfil determined rules, the adjusting the sight angle and for generating said flying instructions being based:
on a determination of the GPS geographical position of the target with respect to the GPS geographical position of the drone, and of the angular position of the target with respect to a main axis linked to the drone, and
on the analysis of a signal produced by analysis of the images successively delivered by the camera of the drone and/or produced by the target and received by the drone,
a merging software engine adapted to merge, in order to obtain refined information about the geographical position of the target:
information about the geographical position of the target, also comprising an associated value of uncertainty of the said geographical position, and
information about the angular position of the target with respect to a main axis linked to the drone, also comprising an associated value of uncertainty of said angular position,
the merging software engine comprising a hybrid-coordinates extended Kalman filter (HC-EKF) that utilizes a combination of spherical and cartesian coordinates is input, comprising:
a prediction unit sensitive to a model of prediction of the target movement and operating based on:
adjusted estimates of the target position and speed obtained based on said target geographical position information and
adjusted estimates of the target position and speed obtained based on said angular position information, as well as respective uncertainties of said estimates;
a first adjustment unit receiving as an input the target geographical position and speed and estimates of the target position and speed coming from the prediction unit, as well as their respective uncertainties, and delivering as an output adjusted values of the target position and speed, as well as their respective uncertainties; and
a second adjustment unit receiving as an input the target angular position and speed and estimates of the target angular position and speed coming from the prediction unit, as well as their respective uncertainties, and delivering as an output adjusted values of the target position and speed, as well as their respective uncertainties.

2. The system according to claim 1, wherein the prediction model is a constant target speed model.

3. The system according to claim 1, wherein the merging software engine further comprises a conversion unit converting the target position and speed information, generated in Cartesian coordinates, into corresponding information converted into angular coordinates, and vice versa, and in that said second adjustment unit operates in angular coordinates.

4. The system according to claim 1, wherein the merging software engine in performing merging takes into account at least one additional piece of information among:
information about the measured altitude of the target;
information about the measured acceleration of the target;
information about the measured distance between the drone and the target; and
additional information about a scale or a scale change in the images taken by the camera.

5. The system according to claim 1, wherein the rate of analysis of the signal produced by analysis of the images successively delivered by the camera of the drone, and/or produced by the target and received by the drone, is higher than the rate at which the GPS geographical positions are determined.

6. The system according to claim 1, wherein the signal produced by analysis of the images successively delivered by the camera of the drone and/or produced by the target and received by the drone, is a visual signal of position of the target in the images generated by the camera of the drone, and in that it includes means for locating and following in the successive images the location of said signal.

7. The system according to claim 6, wherein the camera is a wide-angle fixed camera of the fisheye type and in that the means for adjusting the sight angle of the camera are adapted to frame and process the wide-angle images taken by the camera.

8. The system according to claim 6, wherein the camera is a camera mounted on a three-axis articulated support of the gimbal type with Cardan suspension, provided with servomotors piloted by said means for adjusting the sight angle of the camera.

9. The system according to claim 1, wherein the signal produced by analysis of the images successively delivered by the camera of the drone and/or produced by the target and received by the drone is a signal of the lidar type reflected by the target from an emission by the drone.

* * * * *